(12) United States Patent
Amano (10) Patent No.: US 8,347,450 B2
(45) Date of Patent: Jan. 8, 2013

(54) WIPER BLADE

(75) Inventor: Shinichirou Amano, Toyohashi (JP)

(73) Assignee: ASMO Co., Ltd. (JP)

( * ) Notice: Subject to any disclaimer, the term of this patent is extended or adjusted under 35 U.S.C. 154(b) by 0 days.

(21) Appl. No.: 12/865,459

(22) PCT Filed: Sep. 25, 2009

(86) PCT No.: PCT/JP2009/066671
§ 371 (c)(1),
(2), (4) Date: Jul. 30, 2010

(87) PCT Pub. No.: WO2010/035794
PCT Pub. Date: Apr. 1, 2010

(65) Prior Publication Data
US 2011/0162161 A1 Jul. 7, 2011

(30) Foreign Application Priority Data

Sep. 29, 2008 (JP) ................................. 2008-250938
Jan. 13, 2009 (JP) ................................. 2009-004995

(51) Int. Cl.
*B60S 1/38* (2006.01)
*B60S 1/32* (2006.01)
(52) U.S. Cl. ............. 15/250.201; 15/250.44; 15/250.46; 15/250.361
(58) Field of Classification Search ................ 15/250.44, 15/250.452, 250.46, 250.47, 250.361, 250.351, 15/250.201; *B60S 1/38*
See application file for complete search history.

(56) References Cited

U.S. PATENT DOCUMENTS 5,138,739 A  8/1992 Maubray
5,383,249 A * 1/1995 Yang ....................... 15/250.201
7,603,742 B2 * 10/2009 Nakano et al. ........... 15/250.201
(Continued)

FOREIGN PATENT DOCUMENTS

DE          4116968 A1 * 11/1992
(Continued)

OTHER PUBLICATIONS

International Preliminary Report on Patentability re PCT/JP2009/066671 dated May 10, 2011.
International Search Report for PCT/JP2009/066671.

*Primary Examiner* — Joseph J Hail
*Assistant Examiner* — Marc Carlson
(74) *Attorney, Agent, or Firm* — Caesar, Rivise, Bernstein, Cohen & Pokotilow, Ltd.

(57) ABSTRACT

A wiper blade includes a lever member, a rubber blade, and a movable cover member. The lever member includes a main lever and a yoke lever. The yoke lever includes a plurality of grip portions, by which the rubber blade is gripped. The rubber blade includes a following end projecting outward from the one of the grip portions that is located at a longitudinally outer side of the lever member. The movable cover member includes a holding portion and a basal portion. The holding portion holds the following end. The basal portion is pivotally coupled to the yoke lever so that the movable cover member pivots relative to the yoke lever when the following end bends and deforms in a direction orthogonal to the wiping surface.

21 Claims, 7 Drawing Sheets

U.S. PATENT DOCUMENTS

| | | | |
|---|---|---|---|
| 2004/0177464 A1* | 9/2004 | Steffee et al. | 15/250.41 |
| 2005/0166349 A1* | 8/2005 | Nakano et al. | 15/250.201 |
| 2006/0064841 A1* | 3/2006 | Nakano | 15/250.201 |
| 2007/0089257 A1* | 4/2007 | Harita et al. | 15/250.04 |
| 2007/0143947 A1* | 6/2007 | Harita et al. | 15/250.04 |
| 2009/0165236 A1* | 7/2009 | Lee et al. | 15/250.32 |

FOREIGN PATENT DOCUMENTS

| | | |
|---|---|---|
| JP | 03-132450 A | 6/1991 |
| JP | 05193452 A * | 8/1993 |
| JP | 7-19032 * | 4/1995 |
| JP | 7-019032 U | 4/1995 |
| JP | 7-026266 U | 5/1995 |
| JP | 7-028759 U | 5/1995 |
| JP | 2003-112610 A | 4/2003 |
| JP | 2006-89043 A * | 4/2006 |
| JP | 2006-089043 A | 4/2006 |
| JP | 2008-168796 A | 7/2008 |
| WO | 9919186 A1 | 4/1999 |

* cited by examiner

WIPER BLADE

FIELD OF THE INVENTION

The present invention relates to a wiper blade suitable for wiping a windshield surface or the like of an automobile.

BACKGROUND OF THE INVENTION

A wiper device arranged in a vehicle includes a wiper blade coupled to a wiper arm. One example of such a known wiper blade is provided with a cover that covers a lever assembly including a yoke lever to improve the wiping performance when the vehicle is traveling and improve the outer appearance (aesthetic appeal). An example of such a cover for a wiper blade is disclosed in patent document 1 in which a movable cover member is pivotal to a main lever (primary lever) of the wiper blade. The movable cover member has a basal end pivotally coupled to the main lever. The movable cover member extends to cover part of the yoke lever. Further, the movable cover member has a distal portion that holds a following end of a rubber blade, which projects from a grip portion of the yoke lever in a longitudinal direction. The movable cover member pivots relative to the main lever when the following end of the rubber blade bends and deforms in a direction orthogonal to the wiping surface.

Another known wiper blade includes a wiper blade (see e.g., patent document 2) coupled to a wiper arm by a coupling member or the like at an end portion, which is spaced from an intermediate portion of the wiper blade. Such a wiper blade suppresses the so-called chatter vibration in which the rubber blade is repetitively deflected in the wiping direction due to contact friction or the like with the wiping surface.
Prior Art Documents
  Patent Document
    [Patent Document 1] Japanese Laid-Open Patent Publication No. 2006-89043
    [Patent Document 2] Japanese Laid-Open Patent Publication No. 2008-168796

SUMMARY OF THE INVENTION

In the above-described wiper blade provided with the movable cover member, the following end of the rubber blade greatly projects from the grip portion of the yoke lever. Thus, there is a tendency for its distal portion, in particular, to twist and deflect in various directions. As a result, there is a tendency for contact friction or the like of the rubber blade and the wiping surface causing chatter vibration. Although the following end of the rubber blade is held by the distal portion of the movable cover member, the distal portion of the movable cover member is spaced apart from a pivot shaft of the movable cover member. Thus, a small rattling near the pivot shaft of the movable cover member results in a large rattling in the wiping direction at the distal portion. Accordingly, a large deflection at the following end in the wiping direction and, consequently, chatter vibration cannot be effectively prevented.

Further, in the wiper blade of which end portion is coupled to the wiper arm, even though a cover improve the outer appearance, the coupling portion of the wiper blade and the wiper arm adversely affects the outer appearance.

One object of the present invention is to provide a wiper blade that ensures the rubber blade to follow the wiping surface while maintaining a satisfactory outer appearance. A further object of the present invention is to provide a wiper blade that reduces deflection in the wiping direction at the following end of the rubber blade without adversely affecting the outer appearance.

To achieve the above object, a first aspect of the present invention provides a wiper blade including a lever member, a rubber blade, and a moveable cover member. The lever member includes a main lever and a yoke lever. The main lever is coupled to a wiper arm. The yoke lever is directly or indirectly coupled to the main lever. The yoke lever includes a plurality of grip portions. A rubber blade is gripped by the plurality of grip portions to wipe a wiping surface. The rubber blade includes a following end projecting outward from the one of the grip portions that is located at a longitudinally outer side of the lever member. The movable cover member covers at least part of the yoke lever. The movable cover member includes a holding portion and a basal portion. The holding portion holds the following end. The basal portion is pivotally coupled to the yoke lever so that the movable cover member pivots relative to the yoke lever when the following end bends and deforms in a direction orthogonal to the wiping surface.

In this structure, when the following end of the rubber blade bends and deforms in a direction orthogonal to the wiping surface, the bending and deformation pivots the yoke lever about the pivot shaft portion relative to the main lever and inclines the yoke lever relative to the main lever. Further, the movable cover member holds the following end and is pivotally coupled to the yoke lever, which is coupled to the main lever, about the pivot shaft portion. Thus, the bending and deformation of the following end pivots the movable cover member relative to the yoke lever. Accordingly, the wiper blade has a smoothly curved shape as a whole and maintains a satisfactory outer appearance (aesthetic appearance) as compared to, for example, a structure including a movable cover member, which is coupled to a main lever (or intermediate lever) and forms the outer shape of a wiper blade with the main lever (refer to FIG. 5(b)). In particular, there is a tendency in recent vehicle designs to have a larger and more curved wiping surface. Thus, it is required that the wiper blade be longer and that the wiper blade be able to follow a large curved surface. The structure of the present embodiment is advantageous with respect to such a requirement particularly in terms of "maintaining satisfactory outer appearance". Specifically, in a structure in which the movable cover member is coupled to the main lever (or intermediate lever) (refer to FIG. 5(b)), the yoke lever becomes greatly exposed when the rubber blade follows a large curved surface and a gap is formed between the movable cover member and the rubber blade. This adversely affects the outer appearance. The structure of the present embodiment shown in FIG. 5(a) avoids such problems.

A second aspect of the present invention provides a wiper blade including a lever member, a rubber blade, and a moveable cover member. The lever member includes a main lever and a yoke lever. The main lever is coupled to a wiper arm. The yoke lever is directly or indirectly coupled to the main lever. The yoke lever includes a plurality of grip portions and an outer end portion and an inner end portion in a longitudinal direction of the yoke lever. A rubber blade is gripped by the plurality of grip portions to wipe a wiping surface. The rubber blade includes a following end projecting outward from the one of the grip portions that is located at a longitudinally outer side of the lever member. The movable cover member covers at least part of the yoke lever. The movable cover member includes a holding portion and a basal portion. The holding portion holds the following end. The basal portion is pivotally coupled to the lever member so that the movable cover member pivots about a pivot axis relative to the lever member when the following end bends and deforms in a direction orthogonal to the wiping surface. The movable cover member and the yoke lever include a first engaging portion and a first engaged portion located closer to the outer end portion than the pivot axis. The first engaging portion does not engage the first engaged portion in the direction orthogonal to the wiping surface and engages the first engaged portion in a wiping direction extending along the wiping surface.

In this structure, the first engaging portion arranged in the movable cover member and the first engaged portion arranged in the yoke lever are located toward the distal side from the pivot shaft portion of the movable cover member. Further, the first engaging portion does not engage the first engaged portion in the direction orthogonal to the wiping surface and engages the first engaged portion in the wiping direction. Thus, the movable cover member is pivotal relative to the yoke lever when the following end of the rubber blade bends and deforms in the direction orthogonal to the wiping surface. Further, rattling of the movable cover member in the wiping direction relative to the yoke lever is restricted. Thus, deflection in the wiping direction of the following end, which is held by the holding portion of the movable cover, is reduced. This, in turn, reduces chatter vibration. Further, the structure for reducing chatter vibration (the first engaging portion and the first engaged portion) is formed in the wiper blade without involving with the wiper arm. Thus, such a structure does not adversely affect the outer appearance.

Preferably, the yoke lever includes a longitudinally intermediate portion pivotally coupled to the main lever or an intermediate lever coupled to the main lever. The main lever or intermediate lever and the yoke lever include a second engaging portion and a second engaged portion located closer to the inner end portion than the pivot axis. The second engaging portion does not engage the second engaged portion in the direction orthogonal to the wiping surface and engages the second engaged portion in the wiping direction extending along the wiping surface.

In this structure, the second engaging portion, which is arranged in the main lever, and the second engaged portion, which is arranged in the yoke lever, are located opposite to the first engaged portion with the pivot shaft portion of the yoke lever located in between. Further, the second engaging portion does not engage the second engaged portion in the direction orthogonal to the wiping surface and engages the second engaged portion in the wiping direction. Thus, the bending and deformation of the rubber blade in the direction orthogonal to the wiping surface pivots the yoke lever relative to the main lever. Further, with respect to the pivot shaft portion of the yoke lever, rattling in the wiping direction of the yoke lever relative to the main lever or intermediate lever is restricted at the opposite side of the first engaged portion. This indirectly restricts rattling in the wiping direction of the movable cover member relative to the main lever or intermediate lever. In other words, when the yoke lever rattles in the wiping direction relative to the main lever or the intermediate lever, the movable cover member of which rattling in the wiping direction is restricted relative to the yoke lever would also rattle in the wiping direction relative to the main lever or intermediate lever along with the yoke lever. However, this is prevented. This reduces deflection in the wiping direction of the following end, which is held by the holding portion of the movable cover, and thereby reduces chatter vibration. This structure (the second engaging portion and second engaged portion) is also formed in the wiper blade without involving the wiper arm in the same manner as the first engaging portion and first engaged portion. Accordingly, the structure does not adversely affect the outer appearance (aesthetic appeal).

Preferably, the first engaged portion is arranged in the yoke lever to project outward from the grip portion in the longitudinal direction of the yoke lever.

In this structure, the first engaging portion and the first engaged portion projects from the grip portion in the longitudinal direction toward the distal side of the pivot shaft portion of the movable cover member. Thus, rattling (vibration width) in the wiping direction at the side of the holding portion is further reduced compared to when the first engaging portion and the first engaged portion are engaged at a location closer to the pivot shaft portion of the movable cover member than the grip portion. This reduces deflection and falling in the wiping direction of the following end held at the holding portion of the movable cover member and further reduces chatter vibration.

Preferably, the second engaged portion is arranged in the yoke lever to project inward from the grip portion in the longitudinal direction of the yoke lever.

Preferably, the movable cover member is pivotally coupled to an element of the lever member other than the main lever and the yoke lever.

Preferably, the yoke lever further includes a longitudinally intermediate portion pivotally coupled to the main lever or an intermediate lever coupled to the main lever. The main lever or the intermediate lever includes an intermediate engaging portion having a bulging shape and extending along the longitudinal direction. The intermediate engaging portion has a longitudinally middle part including a pivot shaft portion that pivotally supports the yoke lever. The yoke lever includes an intermediate engaged portion having a recessed shape. The intermediate engaged portion does not engage the intermediate engaging portion when pivoted about the pivot shaft portion and engages the intermediate engaging portion in the wiping direction extending along the wiping surface.

In this structure, the intermediate engaging portion, which is arranged in the main lever or intermediate lever, and the intermediate engaged portion, which is arranged in the yoke lever, are located at the longitudinally intermediate part of the yoke lever. The intermediate engaging portion does not engage the intermediate engaged portion in the direction orthogonal to the wiping surface and constantly engages the intermediate engaged portion in the wiping direction. Thus, the bending and deformation of the rubber blade in the direction orthogonal to the wiping surface pivots the yoke lever relative to the main lever. Further, rattling in the wiping direction of the yoke lever with respect to the main lever is restricted at the intermediate part in the longitudinal direction of the yoke lever. This indirectly restricts rattling in the wiping direction of the movable cover member relative to the main lever or intermediate lever. In other words, when the yoke lever rattles in the wiping direction relative to the main lever or intermediate lever, the movable cover member, which is pivotally coupled to the yoke lever, would also rattle in the wiping direction relative to the main lever or intermediate lever along with the yoke lever. However, this is prevented. Further, for example, in the structure recited in claim 2, the movable cover member of which rattling in the wiping direction is restricted relative to the yoke lever would also rattle in the wiping direction relative to the main lever or intermediate lever along with the yoke lever. However, this is prevented. This reduces deflection in the wiping direction of the following end, which is held by the holding portion of the movable cover, and thereby reduces chatter vibration. This structure (intermediate engaging portion and intermediate engaged portion) is also formed in the wiper blade without involving the wiper arm. Accordingly, the structure does not adversely affect the outer appearance. Further, the pivot shaft portion, which pivotally supports the yoke lever, is arranged at the longitudinally middle part of the intermediate engaging portion, which has a bulging shape and extends along the longitudinal direction. Thus, the pivot shaft portion is securely supported at the intermediate engaging portion, and the rigidity of the pivot shaft portion is easily improved without requiring other support structures or the like. In other words, the intermediate engaging portion also serves as a reinforcement supporting wall for securely supporting the pivot shaft portion.

Preferably, the movable cover member includes two restriction portions sandwiching the following end to restrict movement of the following end in the wiping direction relative to the movable cover member between the holding portion and the grip portion of the yoke lever.

In this structure, the two restriction portions restrict movement and orientation change of the following end in the wiping direction relative to the movable cover member between the holding portion of the movable cover member and the grip portion of the yoke lever. As a result, when the following end is long, in particular, the deflection and falling of the following end in the wiping direction between the holding portion of the movable cover member and the grip portion of the yoke lever are effectively reduced. Further, the chatter vibration at this part is effectively reduced.

Preferably, the main lever includes a first fin surface that generates a force for pushing the rubber blade against the wiping surface with wind received when a vehicle is traveling. The first fin surface extends in the longitudinal direction of the main lever. The movable cover member includes a second fin surface that generates a force for pushing the following end of the rubber blade against the wiping surface with wind received when the vehicle is traveling. The second fin surface extends continuously with the first fin surface along a longitudinal direction of the movable cover member.

In this structure, the first fin surface, which is formed on the main lever, and the second fin surface, which is formed on the movable cover member, of the fin surface cooperate with each other to form the fin surface that has a substantially continuous outer appearance in the longitudinal direction over the entire wiper blade. This results in a satisfactory outer appearance. In particular, when applying this structure to the structure of the first embodiment of the present invention, the wiper blade has a smoothly curved shape as a whole and maintains a satisfactory outer appearance (aesthetic appearance) as compared to, for example, when the movable cover member is coupled to the main lever (or intermediate lever) (refer to FIG. 5(b)). Moreover, force for pushing the rubber blade against the wiping surface is added throughout the longitudinal direction of the wiper blade.

DETAILED DESCRIPTION OF THE PREFERRED EMBODIMENTS

One embodiment of the present invention will now be discussed with reference to FIGS. 1 to 5.

Figure 1:
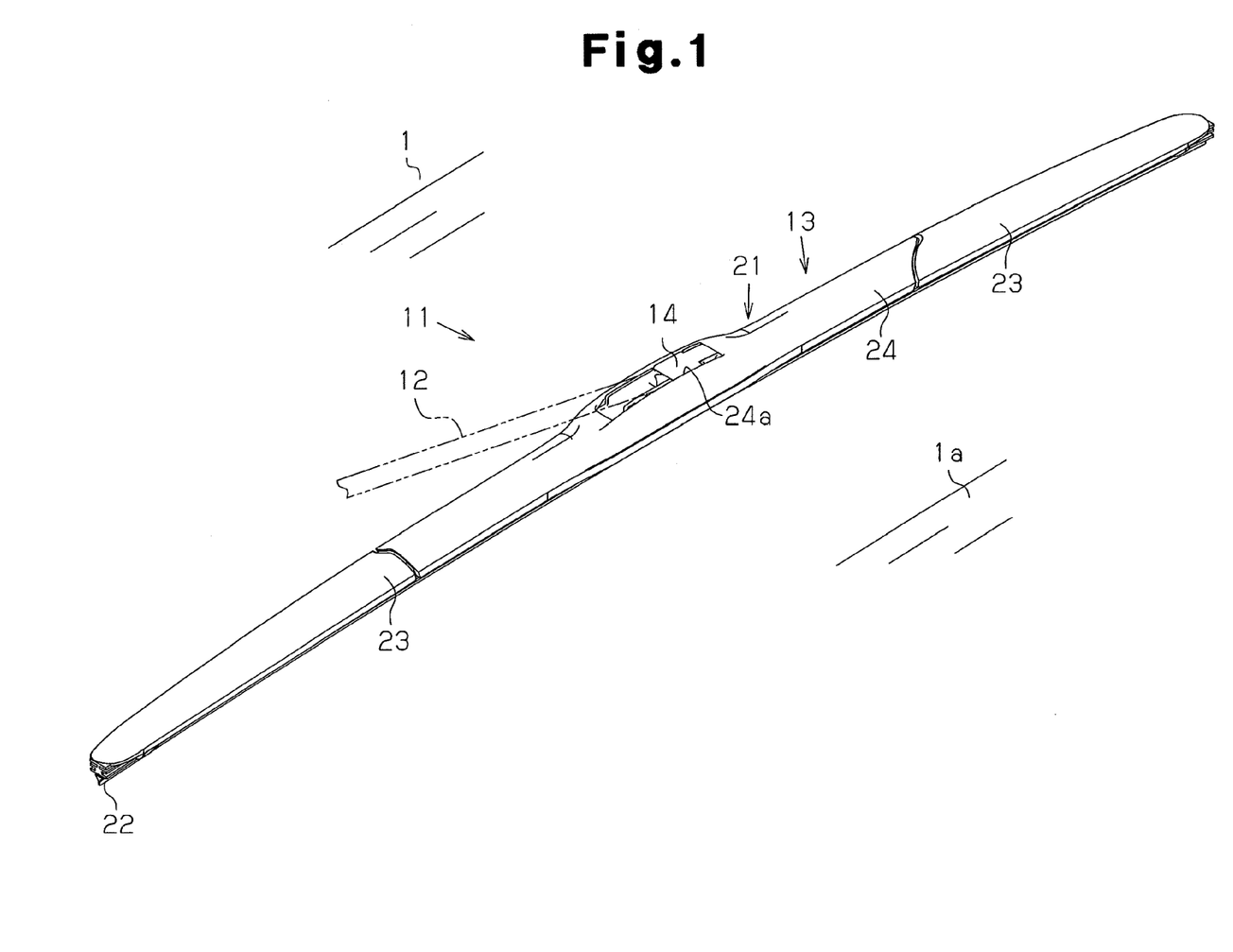
FIG. 1 is a perspective view showing a vehicle wiper according to one embodiment of the present invention.

FIG. 1 shows a vehicle wiper 11 for wiping raindrops or the like on a wiping surface 1a of a windshield (windshield glass) 1 for an automobile. The wiper 11 includes a wiper arm 12 and a wiper blade 13. The wiper arm 12 has a basal portion fixed to a pivot shaft (not shown) that is rotated back and fourth within a predetermined rotational angular range by the driving force of a wiper motor (not shown). The wiper arm 12 swings back and fourth when the pivot shaft rotates back and fourth. A coupling clip 14 pivotally couples the wiper blade 13 to a distal portion of the wiper arm 12. A spring (not shown), which applies a pushing force for pushing the wiper blade 13 against the wiping surface 1a, is attached to the wiper arm 12.

Figure 2A:
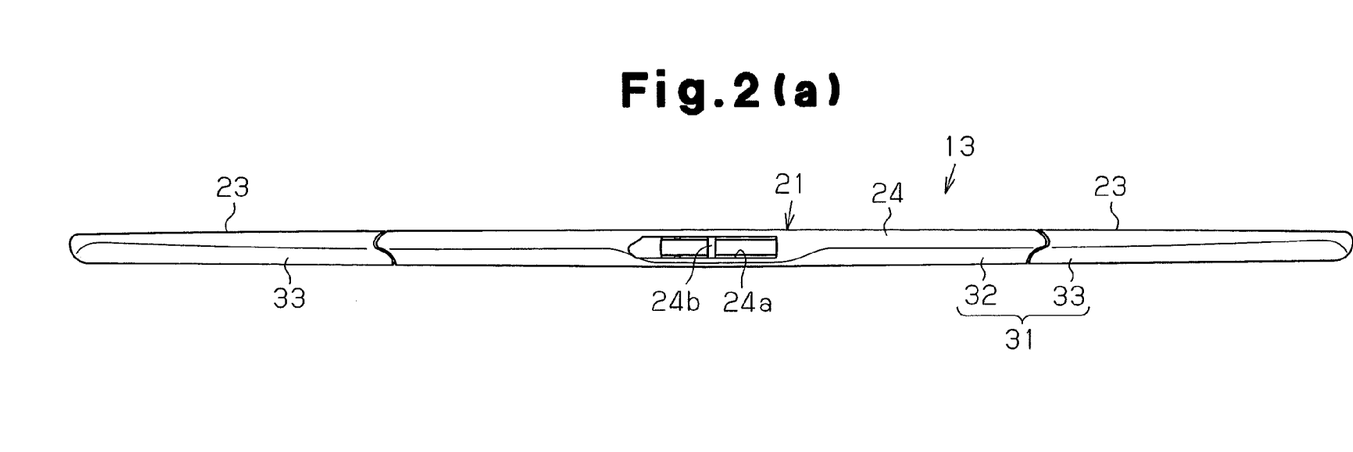
FIG. 2(a) is a plan view showing the wiper blade of FIG. 1.
Figure 2B:
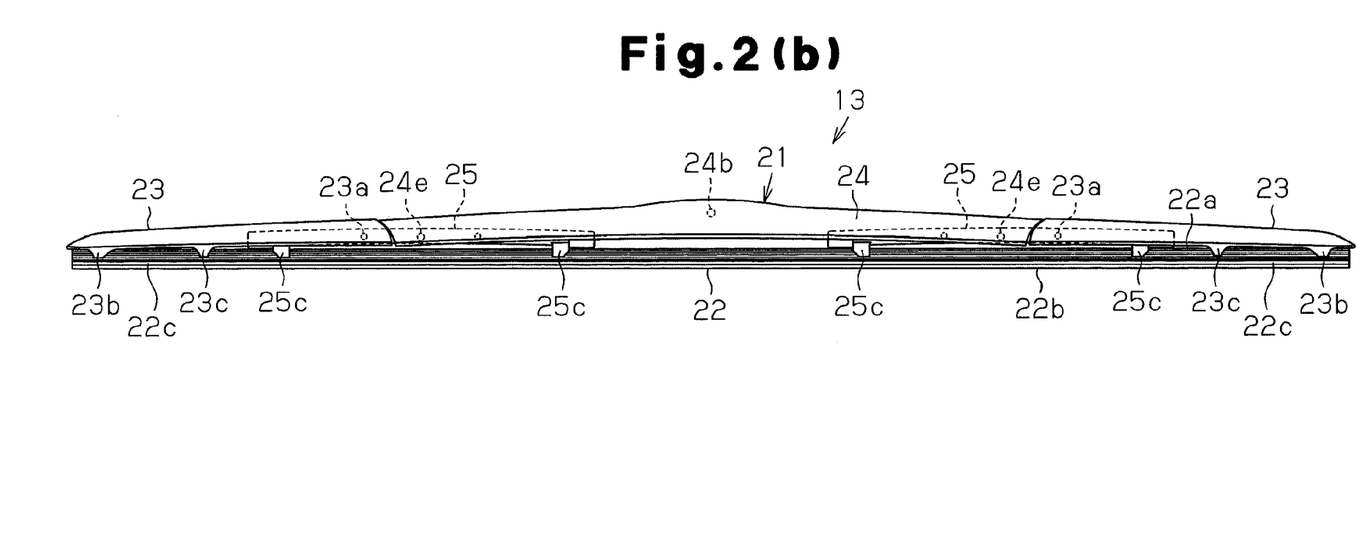
FIG. 2(b) is a front view showing the wiper blade of FIG. 1.
Figure 3A:
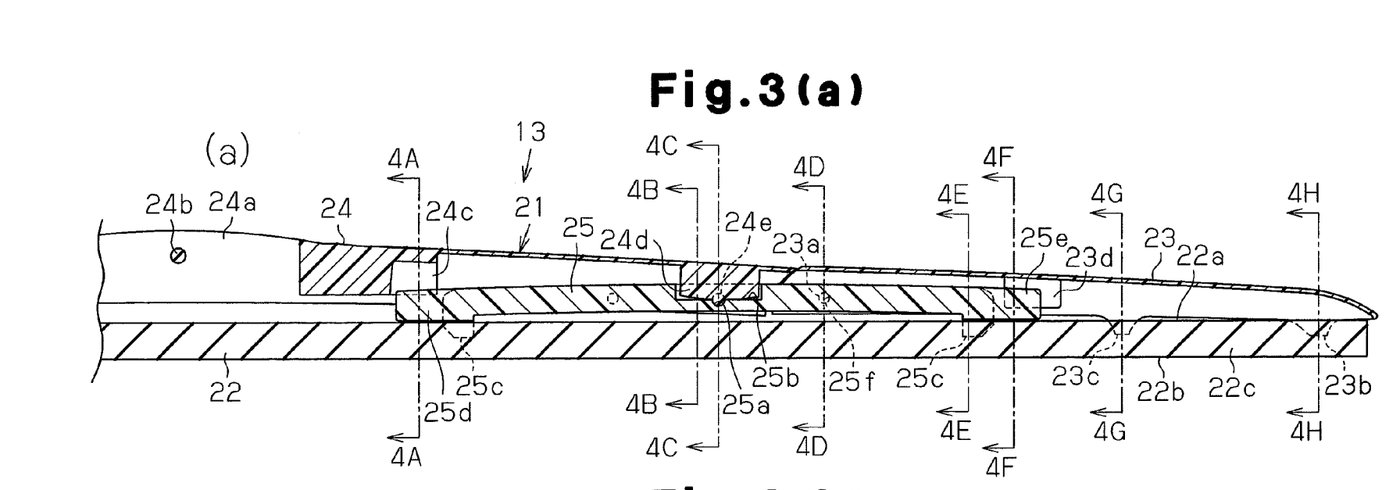
FIG. 3(a) is a partial cross-sectional view of the wiper blade of FIG. 1.

As shown in FIGS. 2(a) to 3, the wiper blade 13 includes a lever member 21, a rubber blade 22, and two movable cover members 23. In FIGS. 2(a) to 3, the rubber blade 22 is shown in a linear state. However, in a state in which no load is applied, the rubber blade 22 is curved to be concave relative to the wiping surface 1a.

The lever member 21 includes a main lever 24 and two yoke levers 25. A longitudinally intermediate portion of the main lever 24 is pivotally coupled to the distal portion of the wiper arm 12. Longitudinally intermediate portions of the yoke levers 25 are pivotally coupled to the longitudinal ends of the main lever 24, respectively.

In detail, the main lever 24 is formed from a resin material, has a generally U-shaped cross-section, which is taken in a direction orthogonal to the longitudinal direction, and is open towards the wiping surface 1a. As shown in FIGS. 1, 2(a), and 3(a), an upper opening 24a extends in a vertical direction (direction orthogonal to the wiping surface 1a) through an upper part (part opposite to the wiping surface 1a) of the longitudinally intermediate portion of the main lever 24. As shown in FIGS. 2(a) to 3(a), a coupling shaft 24b is arranged between two side walls of the main lever 24 to connect the side walls at a position corresponding to the upper opening 24a. The coupling shaft 24b is coupled to the distal portion of the wiper arm 12 by way of the coupling clip 14 (see FIG. 1).

Figure 4A:
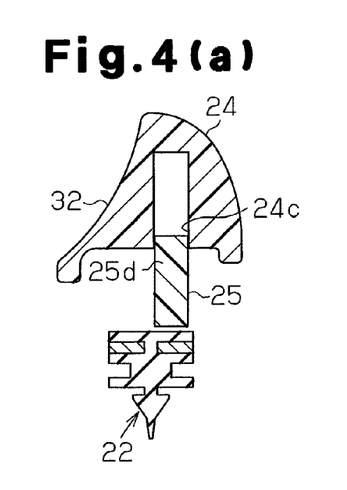
FIGS. 4(a) to 4(h) are cross-sectional views respectively taken along line 4A-4A, line 4B-4B, line 4C-4C, line 4D-4D, line 4E-4E, line 4F-4F, line 4G-4G, and line 4H-4H in FIG. 3(a).

As shown in FIGS. 3(a) and 4(a), the main lever 24 includes a main lever engagement portion 24c serving as a second engaging portion at each of the two longitudinally outer sides of the upper opening 24a. The main lever engagement portion 24c includes two side walls that form a groove or a recess having a relatively narrow width. The distance between the two side walls is constant in the vertical direction (direction orthogonal to the wiping surface 1a). FIG. 3(a) shows about half of the wiper blade 13 in the longitudinal direction, and the opposite side has the same shape.

Figure 4B:
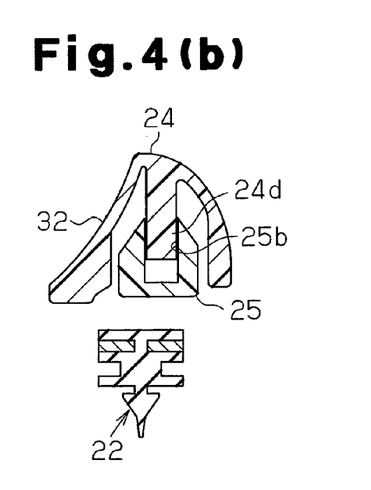
Figure 4C:
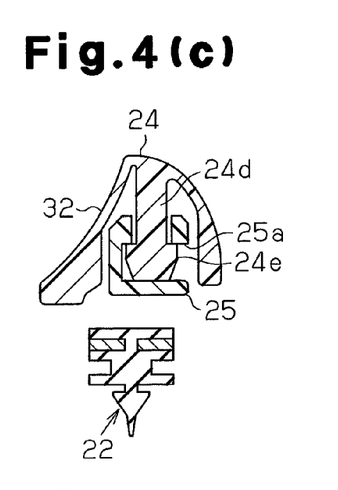
Figure 4D:
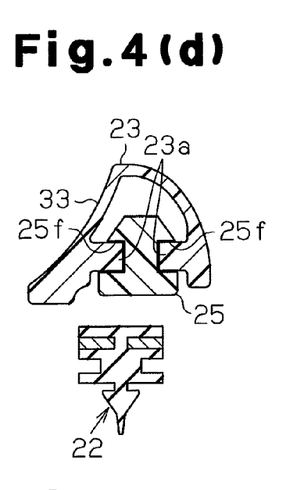

As shown in FIGS. 3(a), 4(b), and 4(c), each longitudinal end portion of the main lever 24 includes an intermediate engaging portion 24d and a pivot shaft portion 24e. The intermediate engaging portion 24d has a bulging shape, and the pivot shaft portion 24e is located in the longitudinally central part of the intermediate engaging portion 24d. The intermediate engaging portion 24d, which projects outwards toward the wiping surface 1a from an inner surface of the main lever 24 having a substantially U-shaped cross-section, extends along the longitudinal direction of the main lever 24. The pivot shaft portion 24e projects outward from the intermediate engaging portion 24d toward two widthwise sides (wiping direction, left and right directions as viewed in FIG. 4(c)) of the intermediate engaging portion 24d. A peak surface of the intermediate engaging portion 24d (lower surface in FIG. 4(c)) is inclined relative to the inner surface of the main lever 24 so that the projection amount of the intermediate engaging portion 24d with respect to the inner surface of the main lever 24 becomes smaller as the pivot shaft portion 24e become farther towards the two longitudinal sides.

Each yoke lever 25 is formed from a resin material and elongated. Each yoke lever 25 includes an outer end, which is located at the outer side of the lever member 21 in the longitudinal direction, and an inner end, which is located at the central part of the lever member 21. In each yoke lever 25, the inner end portion is accommodated in the main lever 24, and the outer end projects out of the main lever 24. As shown in FIGS. 3(a), 3(b), 4(b) and 4(c), the longitudinally intermediate portion of the yoke lever 25 includes a pivot support recess 25a and an intermediate engaged portion 25b. As shown in FIG. 4(c), the pivot support recess 25a extends in the widthwise direction (wiping direction) of the yoke lever 25 to pivotally support the pivot shaft portion 24e. The intermediate engaged portion 25b is a recess that opens to the upper surface of the yoke lever 25 (surface opposite to the wiping surface 1a) and is in communication with the pivot support recess 25a. The intermediate engaged portion 25b accommodates the peak portion of the intermediate engaging portion 24d and is formed so as not to engage with the intermediate engaging portion 24d in a range in which the inclined peak surface of the intermediate engaging portion 24d does not contact. Further, the intermediate engaged portion 25b is formed to engage with the intermediate engaging portion 24d in the widthwise direction (wiping direction) when the yoke lever 25 is pivoted.

Figure 4E:
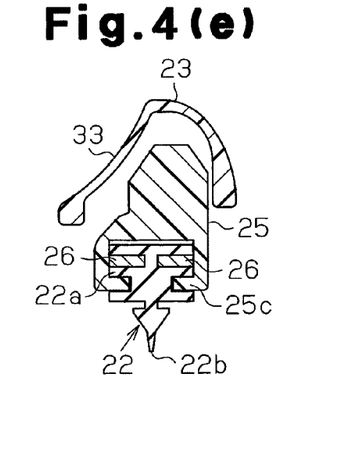

As shown in FIG. 4(e), the two longitudinal ends of the yoke lever 25 each include a grip portion 25c for gripping the rubber blade 22. Each grip portion 25c includes two grip pieces that are extended downward from the two widthwise sides of the yoke lever 25 and bent sideward at the distal ends toward each other to grip an upper portion 22a of the rubber blade 22.

The rubber blade 22 is formed long from a rubber material and includes the upper portion 22a, which is gripped by the grip portion 25c, and a wiping portion 22b, which extends downward from the upper portion 22a (direction towards the wiping surface 1a). Two backings 26, which are formed from a metal material, are attached to the upper portion 22a of the rubber blade 22. The backing 26 disperses the pushing force applied to the wiping surface 1a by the wiper arm 12 in the longitudinal direction. This pushes the wiping portion 22b against the wiping surface 1a even at a following end 22c (see FIG. 3(a)) of the rubber blade 22 that projects more outward in the longitudinal direction of the wiper blade 13 than the yoke levers 25.

Figure 3B:
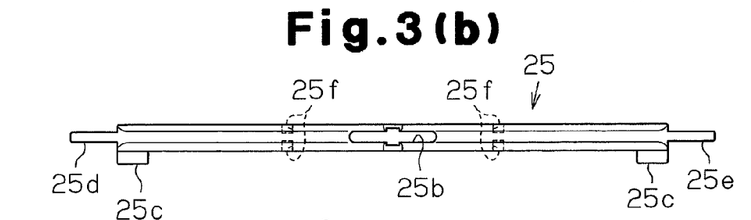
FIG. 3(b) is a plan view showing a yoke lever.
Figure 3C:
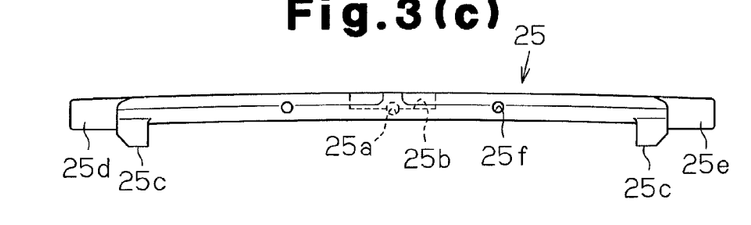
FIG. 3(c) is a side view showing the yoke lever of FIG. 4(a).

As shown in FIGS. 3(b) and 3(c), an inner engagement portion 25d serving as a second engaged portion and an outer engagement portion 25e serving as a first engaged portion project outward in the longitudinal from the grip portion 25c in the widthwise middle part of the longitudinal ends of the yoke lever 25.

As shown in FIG. 4(a), the width (dimension in the wiping direction) of the inner engagement portion 25d is substantially the same as the width of the main lever engagement portion 24c, more specifically, set to be slightly smaller than the width of the main lever engagement portion 24c. The inner engagement portion 25d does not engage the main lever engagement portion 24c in the direction orthogonal to the wiping direction (widthwise direction) and engages the main lever engagement portion 24c in the wiping direction.

The outer engagement portion 25e is formed to have a shape similar to that of the inner engagement portion 25d.

As shown in FIGS. 3(a) to 3(c) and 4(d), the yoke lever 25 has a support recess 25f open toward the two widthwise sides near the intermediate engaged portion 25b. Specifically, the support recess 25f is formed in parts of the yoke lever 25 projecting outward from the longitudinal ends of the main lever 24 and located towards the outer engagement portion 25e from the intermediate engaged portion 25b. The support recess 25f pivotally supports a pivot shaft portion 23a of the movable cover member 23. The movable cover member 23 is pivotal about a pivot axis of the pivot shaft portion 23a relative to the yoke lever 25.

Specifically, the movable cover member 23 is formed from a resin material and substantially covers the portion of the yoke lever 25 projecting out of the longitudinal end of the main lever 24. The movable cover member 23 has a cross-section orthogonal to the longitudinal direction that is entirely shaped to be substantially U-shaped and open towards the wiping surface 1a. The pivot shaft portion 23a (see FIG. 4(d)) is arranged in the two side walls at the longitudinally basal side of the movable cover member 23.

Figure 4F:
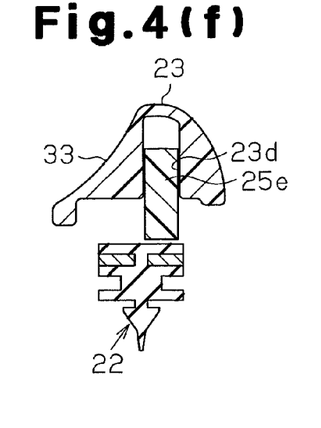
Figure 4G:
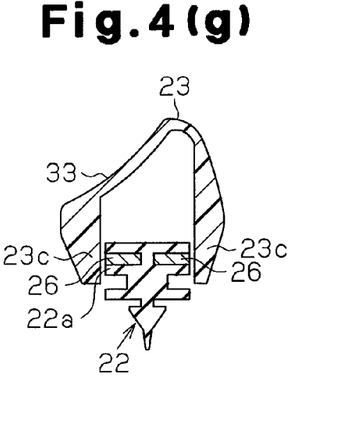
Figure 4H:
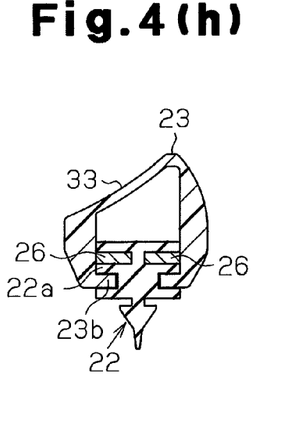

A holding portion 23b (see FIG. 4(h)) for holding the following end 22c (specifically, upper portion 22a) of the rubber blade 22 is formed in the longitudinally distal portion of the movable cover member 23. The holding portion 23b includes two holding pieces that extend downward from the two widthwise sides of the movable cover member 23 and have distal portions bent toward each other to hold the upper portion 22a of the following end 22c of the rubber blade 22.

As shown in FIG. 4(g), two restriction portions 23c extend downward from the two both widthwise sides of the movable cover member 23 to sandwich the upper portion 22a of the following end 22c. The restriction portions 23c restrict movement and falling (orientation change) of the following end 22c in the wiping direction relative to the movable cover member 23 between the holding portion 23b and the grip portion 25c of the yoke lever 25.

As shown in FIGS. 3(a) and 4(f), a cover engagement portion 23d, which serves as a first engaging portion, is formed in the movable cover member 23 at the distal side of the pivot shaft portion 23a at a position corresponding to the outer engagement portion 25e. The cover engagement portion 23d includes two side walls that form a groove or a recess having a relatively narrow width, in which the distance between the two side walls is constant in the vertical direction (direction orthogonal to the wiping surface 1a) in the same manner as the main lever engagement portion 24c. The cover engagement portion 23d does not engage the outer engagement portion 25e in the direction orthogonal to the wiping surface 1a and engages the outer engagement portion 25e in the wiping direction (widthwise direction).

In the present embodiment, the main lever 24 forms the outer appearance of the wiper blade 13 with the movable cover member 23. As shown in FIGS. 2(a) and 4, a first fin surface 32, which generates force for pushing the rubber blade 22 towards the wiping surface 1a with the wind received when the vehicle is traveling, extends in the longitudinal direction along the vehicle frontward side of the main lever 24 (portion of the main lever 24 located toward the front of the vehicle when the wiper 11 is attached to the vehicle). As shown in FIGS. 2(*a*) and 4, a second fin surface 33, which generates force for pushing the following end of the rubber blade 22 towards the wiping surface 1*a* with the wind received when the vehicle is traveling, extends continuously in the longitudinal direction from the first fin surface 32 along the vehicle frontward side of the movable cover member 23 (portion of the main lever 24 located toward the front of the vehicle when the wiper 11 is attached to the vehicle). The first and second fin surfaces 32 and 33 formed in the main lever 24 and the movable cover member 23 cooperate with each other to form a fin surface 31 that presents a substantially continuous outer appearance in the longitudinal direction over the entire wiper blade 13.

The embodiment has the following advantages.

Figure 5A:
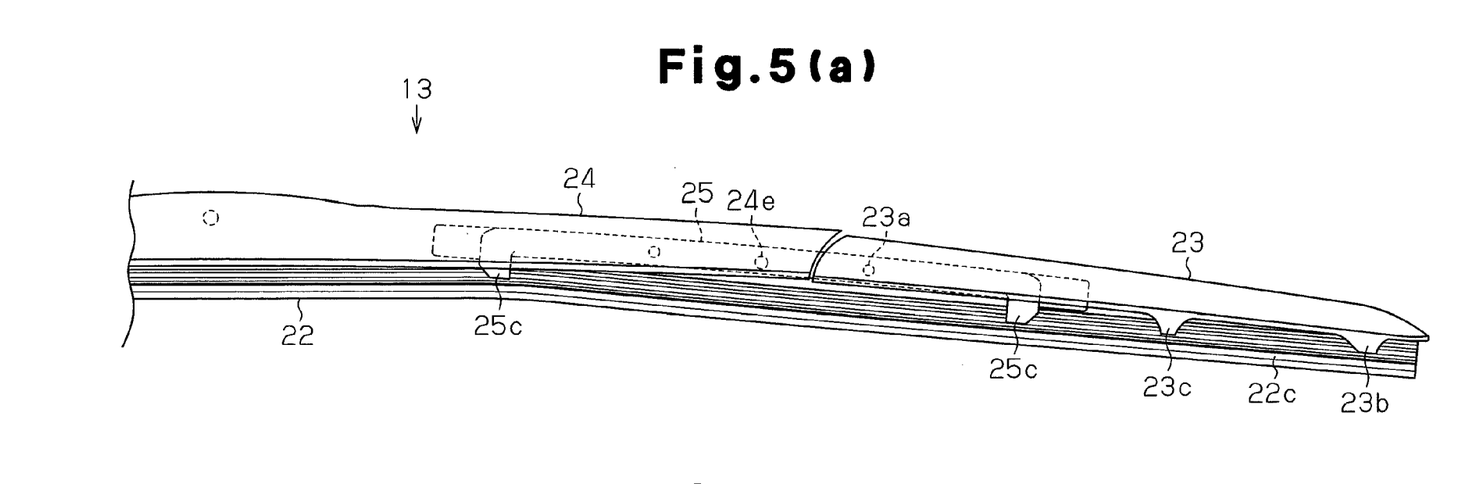
FIG. 5(a) is a partial front view showing the wiper blade of FIG. 1 in a state in which the following end is bent and deformed.
Figure 5B:
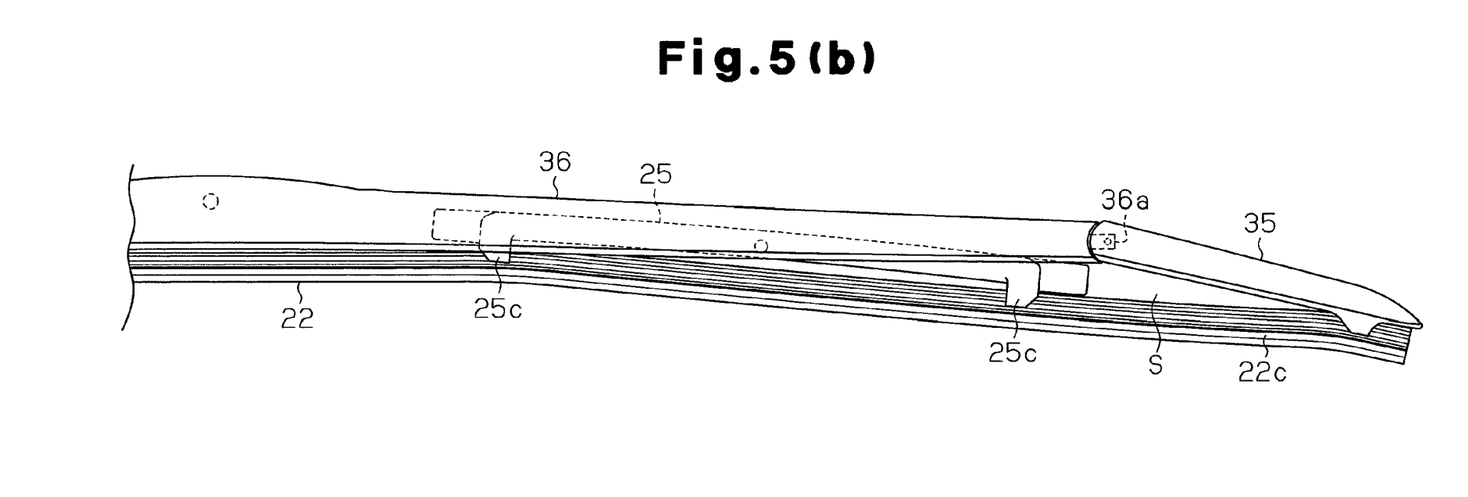
FIG. 5(b) is a partial front view showing a comparative wiper blade in a state in which the following end is bent and deformed.

(1) When the following end 22*c* of the rubber blade 22 bends and deforms in a direction orthogonal to the wiping surface 1*a*, the bending and deformation pivots the yoke lever 25 about the pivot shaft portion 24*e* relative to the main lever 24 and inclines the yoke lever 25 relative to the main lever 24, as shown in FIG. 5(*a*). The movable cover member 23 holds the following end 22*c* and is pivotally coupled to the yoke lever 25, which is coupled to the main lever 24, about the pivot shaft portion 23*a*. Thus, the bending and deformation of the following end 22*c* pivots the movable cover member 23 relative to the yoke lever 25. Accordingly, the wiper blade 13 has a smoothly curved shape as a whole and maintains a satisfactory outer appearance (aesthetic appearance) as compared to, for example, a structure shown in FIG. 5(*b*) in which the movable cover member 35 is coupled to the main lever 36.

Specifically, for example, when the movable cover member is coupled to the main lever, the yoke lever must pivot freely relative to the main lever. Further, the coupling portion of the movable cover member and the main lever must be preventing from being larger in the widthwise direction than other portions since this would adversely affect the outer appearance of the wiper blade. Thus, as shown in FIG. 5(*b*), the main lever 36 must be projected outward beyond the longitudinal end of the yoke lever 25, and the movable cover member 35 must be coupled to the projecting portion 36*a*. This, however, increases the pivoting amount of the movable cover member 35 relative to the main lever 36, and the movable cover member 35 is greatly inclined relative to the main lever 36. As a result, the outer appearance (aesthetic appeal) of the entire wiper blade is adversely affected.

In contrast, with the structure of the present embodiment shown in FIG. 5(*a*), the movable cover member 23 is not greatly inclined relative to the main lever 24, and a satisfactory outer appearance is maintained in which the movable cover member 23 and the main lever 24 are smoothly continuous. In particular, there is a tendency in recent vehicle designs to have a larger and more curved wiping surface 1*a*. Thus, it is required that the wiper blade 13 be longer and that the wiper blade 13 be able to follow a large curved surface. The structure of the present embodiment is advantageous with respect to such a requirement particularly in terms of "maintaining a satisfactory outer appearance".

Further, in the structure shown in FIG. 5(*b*) in which the movable cover member 35 is coupled to the main lever 36, the yoke lever 25 becomes greatly exposed when the rubber blade 22 follows a large curved surface and a gap S is formed between the movable cover member 35 and the rubber blade 22. This adversely affects the outer appearance. The structure of the present embodiment shown in FIG. 5(*a*) avoids such problems.

Figure 6:
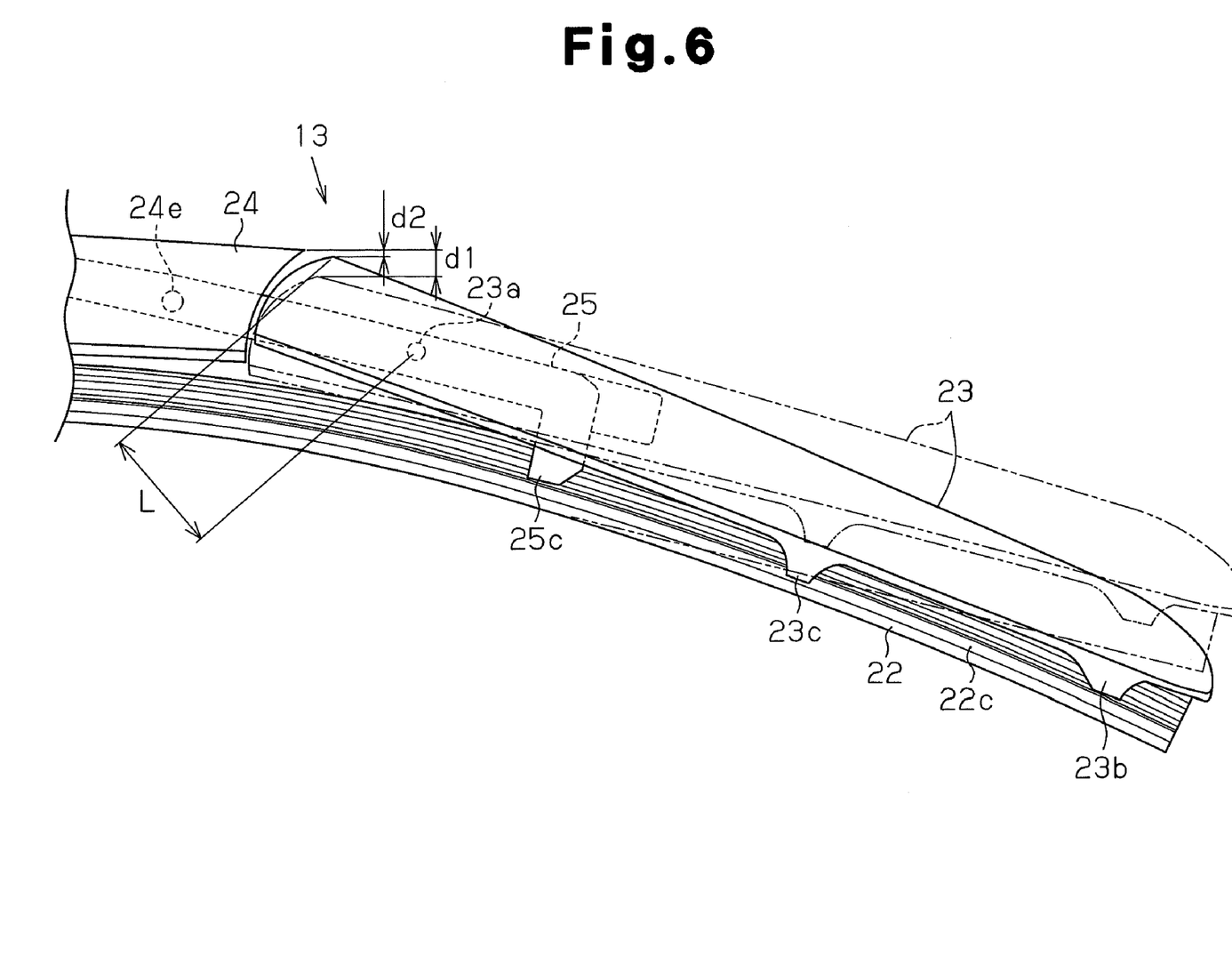
FIG. 6 is a partial front view showing the movable cover member in a pivoted state.

Further advantages obtained from the structure in which the movable cover member 23 is pivotally coupled to the yoke lever 25 will now be described with reference to FIG. 6. FIG. 6 shows a state in which the yoke lever 25 is pivoted relative to the main lever 24. In FIG. 6, the inclination angle of the yoke lever 25 relative to the main lever 24 is shown greatly exaggerated from the actual angle to facilitate understanding.

In FIG. 6, the double-dashed lines show the movable cover member 23 in a state in which it is not pivoted relative to the yoke lever 25. When the yoke lever 25 is pivoted relative to the main lever 24 but the movable cover member 23 is not pivoted relative to the yoke lever 25, a relatively large step difference d1 is formed between the distal portion of the main lever 24 and the opposing basal end of the movable cover member 23. The large step difference d1 eliminates the smooth connection between the first fin surface 32 of the main lever 24 and the second fin surface 33 of the movable cover member 23. This adversely affects the outer appearance of the wiper blade 13.

However, in the present embodiment, as shown by the solid lines in FIG. 6, the yoke lever 25 is pivoted relative to the main lever 24. In addition, the movable cover member 23 is pivoted about the pivot shaft portion 23*a* relative to the yoke lever 25 and inclined relative to the yoke lever 25. In this case, the basal end of the movable cover member 23 moves. This decreases the step difference between the basal end and the distal portion of the main lever 24 from d1, which is shown for the double-dashed lines, to d2, which is a shown for the solid lines. This maintains the smooth connection between the first fin surface 32 of the main lever 24 and the second fin surface 33 of the movable cover member 23 and the outer appearance of the wiper blade 13 is not adversely affected.

A greater distance L between the basal end of the movable cover member 23 and the pivot shaft portion 23*a* is advantageous in reducing the step difference.

(2) The cover engagement portion 23*d* arranged in the movable cover member 23 and the outer engagement portion 25*e* arranged in the yoke lever 25 are located toward the distal side from the pivot shaft portion 23*a* of the movable cover member 23. When the wiper blade 13 is in a wiping state, the cover engagement portion 23*d* constantly does not engage the outer engagement portion 25*e* in the direction orthogonal to the wiping surface 1*a* and constantly engages the outer engagement portion 25*e* in the wiping direction that extends along the wiping surface 1*a*. That is, the cover engagement portion 23*d* engages the outer engagement portion 25*e* so as to permit the cover engagement portion 23*d* to move in the direction orthogonal to the wiping surface 1*a* but not in the wiping direction extending along the wiping surface 1*a*. Thus, the movable cover member 23 is pivotal relative to the yoke lever 25 when the following end 22*c* of the rubber blade 22 bends and deforms in the direction orthogonal to the wiping surface 1*a*. This restricts rattling of the movable cover member 23 in the wiping direction relative to the yoke lever 25. Thus, deflection in the wiping direction of the following end 22*c*, which is held by the holding portion 23*b* of the movable cover member 23, is reduced. This, in turn, reduces chatter vibration. Further, the structure for reducing chatter vibration (the cover engagement portion 23*d* and outer engagement portion 25*e*) is formed in the wiper blade 13 without involving with the wiper arm 12. Thus, such a structure does not adversely affect the outer appearance. Further, the fin surface 31 is not coupled to the wiper arm 12 and is uniformly formed in the longitudinal direction of the wiper blade 13 in the present embodiment. Accordingly, the fin surface 31 does not involve the wiper arm 12. Thus, the advantage of the fin surface 31 is not affected, in which the advantage is the generation of force for pushing the following end of the rubber blade 22 towards the wiping surface 1a with the wind received when the vehicle is traveling.

(3) The main lever engagement portion 24c, which is arranged in the main lever 24, and the inner engagement portion 25d, which is arranged in the yoke lever 25, are located opposite to the outer engagement portion 25e with the pivot shaft portion 24e of the yoke lever 25 located in between. Further, when the wiper blade 13 is in the wiping state, the main lever engagement portion 24c constantly does not engage the inner engagement portion 25d in the direction orthogonal to the wiping surface 1a and constantly engages the inner engagement portion 25d in the wiping direction. That is, the engagement of the main lever engagement portion 24c and the inner engagement portion 25d permits the main lever engagement portion 24c to move relative to the outer engagement portion 25e in the direction orthogonal to the wiping surface 1a but inhibits movement of the main lever engagement portion 24c in the wiping direction along the wiping surface 1a. Thus, the bending and deformation of the rubber blade 22 in the direction orthogonal to the wiping surface 1a pivots the yoke lever 25 relative to the main lever 24.

With respect to the pivot shaft portion 24e of the yoke lever 25, rattling in the wiping direction of the yoke lever 25 relative to the main lever 24 is restricted at the opposite side of the outer engagement portion 25e. This indirectly restricts rattling in the wiping direction of the movable cover member 23 relative to the main lever 24. In other words, when the yoke lever 25 rattles in the wiping direction relative to the main lever 24, the movable cover member 23 of which rattling in the wiping direction is restricted relative to the yoke lever 25 would also rattle in the wiping direction relative to the main lever 24 along with the yoke lever 25. However, this is prevented. This reduces deflection in the wiping direction of the following end 22c, which is held by the holding portion 23b of the movable cover member 23, and thereby reduces chatter vibration. This structure (main lever engagement portion 24c and inner engagement portion 25d) is also formed in the wiper blade 13 without involving the wiper arm 12. Accordingly, the structure does not adversely affect the outer appearance.

(4) The intermediate engaging portion 24d, which is arranged in the main lever 24, and the intermediate engaged portion 25b, which is arranged in the yoke lever 25, are located at the longitudinally intermediate part of the yoke lever 25. When the wiper blade 13 is in the wiping state, the intermediate engaging portion 24d constantly does not engage the intermediate engaged portion 25b in the direction orthogonal to the wiping surface 1a and constantly engages the intermediate engaged portion 25b in the wiping direction. That is, the engagement of the intermediate engaging portion 24d and the intermediate engaged portion 25b permits the intermediate engaged portion 25b to move in the direction orthogonal to the wiping surface 1a and inhibits movement of the intermediate engaging portion 24d in the wiping direction along the wiping surface 1a. Thus, the bending and deformation of the rubber blade 22 in the direction orthogonal to the wiping surface 1a pivots the yoke lever 25 relative to the main lever 24. Further, rattling in the wiping direction of the yoke lever 25 with respect to the main lever 24 is restricted at the intermediate part in the longitudinal direction of the yoke lever 25. This indirectly restricts rattling in the wiping direction of the movable cover member 23 relative to the main lever 24. In other words, when the yoke lever 25 rattles in the wiping direction relative to the main lever 24, the movable cover member 23 of which rattling in the wiping direction is restricted relative to the yoke lever 25 would also rattle in the wiping direction relative to the main lever 24 along with the yoke lever 25. However, this is prevented. This reduces deflection in the wiping direction of the following end 22c, which is held by the holding portion 23b of the movable cover member 23, and thereby reduces chatter vibration. This structure (intermediate engaging portion 24d and intermediate engaged portion 25b) is also formed in the wiper blade 13 without involving the wiper arm 12. Accordingly, the structure does not adversely affect the outer appearance.

Further, the pivot shaft portion 24e, which pivotally supports the yoke lever 25, is arranged at the longitudinally middle part of the intermediate engaging portion 24d, which has a bulging shape and extends along the longitudinal direction. Thus, the pivot shaft portion 24e is securely supported at the intermediate engaging portion 24d, and the rigidity of the pivot shaft portion 24e is easily improved without requiring other support structures or the like. In other words, the intermediate engaging portion 24d also serves as a reinforcement supporting wall for securely supporting the pivot shaft portion 24e.

(5) The two restriction portions 23c restrict movement and falling (orientation change) of the following end 22c in the wiping direction relative to the movable cover member 23 between the holding portion 23b of the movable cover member 23 and the grip portion 25c of the yoke lever 25. Thus, when the following end 22c is long, in particular, the deflection and falling of the following end 22c in the wiping direction between the holding portion 23b of the movable cover member 23 and the grip portion 25c of the yoke lever 25 are effectively reduced. Further, the chatter vibration at this part is effectively reduced. In addition, the contact angle of the wiping portion 22b relative to the wiping surface 1a is maintained in a suitable manner. This improves the wiping property.

(6) The outer engagement portion 25e of the yoke lever 25 projects outward in the longitudinal direction from the grip portion 25c. As a result, the cover engagement portion 23d constantly engages the outer engagement portion 25e in the wiping direction when the wiper blade 13 is in a wiping state at a location projecting in the longitudinal direction from the grip portion 25c toward the distal side of the pivot shaft portion 23a of the movable cover member 23 (position close to the holding portion 23b). Thus, rattling (vibration width) in the wiping direction at the side of the holding portion 23b is further reduced compared to when the cover engagement portion 23d and the outer engagement portion 25e are engaged at a location closer to the pivot shaft portion 23a of the movable cover member 23 than the grip portion 25c. This reduces deflection and falling in the wiping direction of the following end 22c held at the holding portion 23b of the movable cover member 23 and further reduces chatter vibration.

(7) The inner engagement portion 25d of the yoke lever 25 projects from the grip portion 25c in the longitudinal direction. As a result, the main lever engagement portion 24c constantly engages the inner engagement portion 25d in the wiping direction in the wiping state of the wiper blade 13 at a location projecting in the longitudinal direction from the grip portion 25c at the opposite side of the outer engagement portion 25e relative to the pivot shaft portion 24e of the yoke lever 25. Thus, rattling (vibration width) of the yoke lever 25 in the wiping direction relative to the main lever 24 is further reduced compared to when the main lever engagement portion 24c and the inner engagement portion 25d are engaged at a location closer to the pivot shaft portion 24e of the yoke lever 25 than the grip portion 25c. This further reduces rattling (vibration width) in the wiping direction of the movable cover member 23 relative the main lever 24. As a result, deflection in the wiping direction of the following end 22c held at the holding portion 23b of the movable cover member 23 and chatter vibration are further reduced.

(8) The first fin surface 32, which is formed on the main lever 24, and the second fin surface 33, which is formed on the movable cover member 23, of the fin surface 31 cooperate with each other to form the fin surface 31 that has a substantially continuous outer appearance in the longitudinal direction over the entire wiper blade 13. This results in a satisfactory outer appearance.

The above-described embodiment may be modified as described below.

Figure 7:
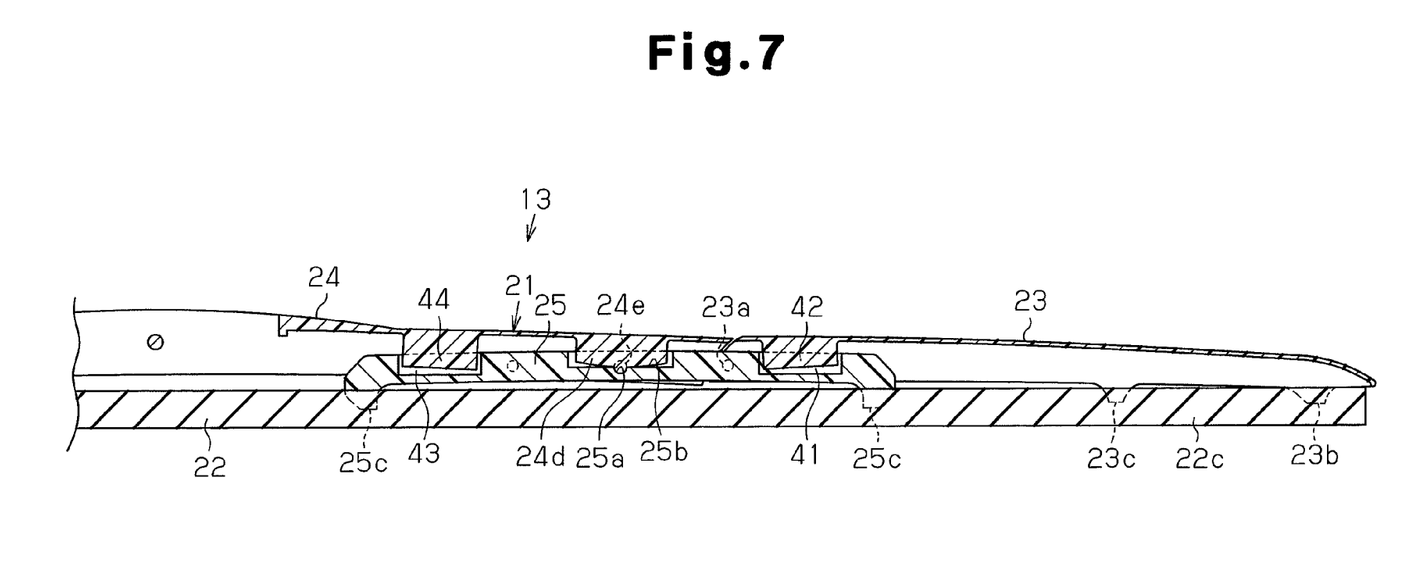
FIG. 7 is a partial cross-sectional view showing a further example of a wiper blade.

In the above-described embodiment, the inner engagement portion 25d and the outer engagement portion 25e of the yoke lever 25 are arranged to project outward from the grip portion 25c in the longitudinal direction but are not limited in such a manner. As shown in FIG. 7, an inner engagement portion 43 and an outer engagement portion 41 may be arranged inward from the grip portion 25c.

Specifically, the outer engagement portion 41 is formed to have a recessed shape and is located toward the pivot shaft portion 23a from the grip portion 25c at the distal side from the pivot shaft portion 23a of the movable cover member 23. A cover engagement portion 42 of the movable cover member 23 is formed to have a bulging shape at a position corresponding to the outer engagement portion 41. The outer engagement portion 41 does not engage the cover engagement portion 42 in the direction orthogonal to the wiping surface 1a and engages the cover engagement portion 42 in the wiping direction.

The inner engagement portion 43 is formed to have a recessed shape and is located toward the pivot shaft portion 24e from the grip portion 25c at the opposite side of the outer engagement portion 41 with the pivot shaft portion 24e of the yoke lever 25 located in between. A main lever engagement portion 44 of the main lever 24 is formed to have a bulging shape at a position corresponding to the inner engagement portion 43. The inner engagement portion 43 constantly does not engage the main lever engagement portion 44 in the direction orthogonal to the wiping surface 1a and constantly engages the main lever engagement portion 44 in the wiping direction when the wiper blade 13 is in a wiping state.

Such a structure also obtains the same advantages as advantages (1) and (2) of the above-described embodiment. Obviously, the outer engagement portion 25e (41) and the cover engagement portion 23d (42), and the inner engagement portion 25d (43) and the main lever engagement portion 24c (44) may be changed to other shapes (e.g., configuration in which the projection and recess are reversed) or may be changed to other combinations (e.g., combination of the above embodiment and another example (see FIG. 7)) as long as they do not engage each other in the direction orthogonal to the wiping surface 1a but engage each other in the wiping direction.

In the above-described embodiment, the main lever engagement portion 24c is formed in the main lever 24 and the inner engagement portion 25d is formed in the yoke lever 25 but are not limited in such a manner. The main lever engagement portion 24c may be excluded from the main lever 24, and the inner engagement portion 25d may be excluded from the yoke lever 25.

In the above-described embodiment, the intermediate engaging portion 24d is formed in the main lever 24 and the intermediate engaged portion 25b is formed in the yoke lever 25 but not limited in such a manner. The intermediate engaging portion 24d may be excluded from the main lever 24, and the intermediate engaged portion 25b may be excluded from the yoke lever 25.

In the above-described embodiment, the two restriction portions 23c are formed in the movable cover member 23 but are not limited in such a manner. The restriction portions 23c may be excluded from the movable cover member 23.

In the above-described embodiment, the lever member 21 includes the main lever 24 and the yoke lever 25 but is not limited in such a manner. For example, an intermediate lever may be pivotally coupled to the main lever, and the yoke lever may be pivotally coupled to the intermediate lever. Multiple stages of coupled levers may used. That is, there may be more coupled levers than the above-described embodiment. In such a case, the main lever engagement portion 24c, the intermediate engaging portion 24d, and the like of the above-described embodiment are arranged in an intermediate lever.

In the above-described embodiment, the yoke lever 25 is formed from a resin material but is not limited in such a manner. The yoke lever 25 may be formed from a metal material or be partially formed from metal.

In the above-described embodiment, the main lever 24 forms the outer shape of the wiper blade 13 with the movable cover member 23. In other words, the main lever 24 also serves as a center cover but is not limited in such a manner. The main lever 24 may include a main lever, which is formed from a metal material, and a center cover, which is formed from a resin material and fixed to the main lever.

As shown in FIG. 2(a) and FIG. 4, in the above-described embodiment, the fin surface 31 includes the first fin surface 32 and the second fin surface 33. The first fin surface 32 and the second fin surface 33 are formed in the main lever 24 and the movable cover member 23 to have a continuous outer appearance but are not limited in such a manner. For example, the fin surface 31 does not have to include the main lever 24 and the movable cover member 23.

In the above-described embodiment, the movable cover member 23 is pivotally coupled to the yoke lever 25 but is not limited in such a manner. The movable cover member 23 may be coupled to a lever member other than the main lever 24 and the yoke lever 25 such as an intermediate lever coupled between the main lever and the yoke lever.

DESCRIPTION OF REFERENCE CHARACTERS

1a . . . wiping surface
12 . . . wiper arm
21 . . . lever member
22 . . . rubber blade
22c . . . following end
23 . . . movable cover member
23a . . . pivot shaft portion
23b . . . holding portion
23c . . . restriction portion
23d, 42 . . . cover engagement portion (first engaging portion)
24 . . . main lever
24c, 44 . . . main lever engagement portion (second engaging portion)
24d . . . intermediate engaging portion
24e . . . pivot shaft portion
25 . . . yoke lever
25b . . . intermediate engaged portion
25c . . . grip portion
25d, 43 . . . inner engagement portion (second engaged portion)
25e, 41 . . . outer engagement portion (first engaged portion)
32, 33 . . . first and second fin surfaces While the invention has been described in detail and with reference to specific embodiments thereof, it will be apparent to one skilled in the art that various changes and modifications can be made therein without departing from the spirit and scope thereof.

The invention claimed is:

1. A wiper blade comprising:
   a lever member including a main lever coupled to a wiper arm and a yoke lever directly or indirectly coupled to the main lever, the yoke lever including a plurality of grip portions;
   a rubber blade gripped by the plurality of grip portions to wipe a wiping surface, the rubber blade including a following end projecting outward from the one of the grip portions that is located at a longitudinally outer side of the lever member; and
   a movable cover member covering at least part of the yoke lever, the movable cover member including a holding portion, which holds the following end, and a basal portion, which is pivotally coupled to the yoke lever so that the movable cover member pivots relative to the yoke lever when the following end bends and deforms in a direction orthogonal to the wiping surface
   wherein the movable cover member pivots about a pivot axis relative to the yoke lever, the pivot axis is located outside of a longitudinal end of the main lever and the basal portion is extended from the pivot axis toward the main lever so that a predetermined basal length is formed between the pivot axis and a basal end of an upper surface of the movable cover member.

2. The wiper blade according to claim 1, wherein the yoke lever further includes a longitudinally intermediate portion pivotally coupled to the main lever or an intermediate lever coupled to the main lever;
   the main lever or the intermediate lever includes an intermediate engaging portion having a bulging shape and extending along a longitudinal direction of the main lever or the intermediate lever, and the intermediate engaging portion having a longitudinally middle part including a pivot shaft portion that pivotally supports the yoke lever; and
   the yoke lever includes an intermediate engaged portion having a recessed shape, and the intermediate engaged portion does not engage the intermediate engaging portion when pivoted about the pivot shaft portion and engages the intermediate engaging portion in a wiping direction extending along the wiping surface.

3. The wiper blade according to claim 1, wherein the movable cover member includes two restriction portions sandwiching the following end to restrict movement of the following end in a wiping direction relative to the movable cover member between the holding portion and the grip portion.

4. The wiper blade according to claim 1, wherein the main lever includes a first fin surface that generates a force for pushing the rubber blade against the wiping surface with wind received when a vehicle is traveling, the first fin surface extending in a longitudinal direction of the main lever; and
   the movable cover member includes a second fin surface that generates a force for pushing the following end of the rubber blade against the wiping surface with wind received when the vehicle is traveling, the second fin surface extending continuously with the first fin surface along a longitudinal direction of the movable cover member.

5. The wiper blade according to claim 1, wherein the main lever includes a pivot shaft portion that pivotally supports the yoke lever, the main lever extends in the longitudinal direction so that a predetermined distal length is formed between the pivot shaft portion and a distal portion of an upper surface of the main lever, and
   the predetermined distal length is generally the same as the predetermined basal length.

6. The wiper blade according to claim 1, wherein when the yoke lever is pivoted relative to the main lever while the movable cover member is pivoted relative to the yoke lever, a first step difference is formed between a basal end of an upper surface of the movable cover member and a distal portion of an upper surface of the main lever,
   the predetermined basal length is set so that the first step difference becomes smaller than a second step difference which is formed when the yoke lever is pivoted relative to the main lever while the movable cover member is not pivoted relative to the yoke lever.

7. A wiper blade comprising:
   a lever member including a main lever coupled to a wiper arm and a yoke lever directly or indirectly coupled to the main lever, the yoke lever including a plurality of grip portions and an outer end portion and inner end portion in a longitudinal direction of the yoke lever;
   a rubber blade gripped by the plurality of grip portions to wipe a wiping surface, the rubber blade including a following end projecting outward from the one of the grip portions that is located at a longitudinally outer side of the lever member; and
   a movable cover member covering at least part of the yoke lever, the movable cover member including a holding portion, which holds the following end, and a basal portion, which is pivotally coupled to the lever member so that the movable cover member pivots about a pivot axis relative to the lever member when the following end bends and deforms in a direction orthogonal to the wiping surface;
   wherein the movable cover member and the yoke lever include a first engaging portion and a first engaged portion located closer to the outer end portion than the pivot axis, and the first engaging portion does not engage the first engaged portion in the direction orthogonal to the wiping surface and engages the first engaged portion in a wiping direction extending along the wiping surface.

8. The wiper blade according to claim 7, wherein the yoke lever includes a longitudinally intermediate portion pivotally coupled to the main lever or an intermediate lever coupled to the main lever; and
   any one of the main lever and intermediate lever and the yoke lever include a second engaging portion and a second engaged portion located closer to the inner end portion than the pivot axis, and the second engaging portion does not engage the second engaged portion in the direction orthogonal to the wiping surface and engages the second engaged portion in the wiping direction extending along the wiping surface.

9. The wiper blade according to claim 8, wherein the second engaged portion is arranged in the yoke lever to project inward from the grip portion in the longitudinal direction of the yoke lever.

10. The wiper blade according to claim 8, wherein the first engaged portion is arranged in the yoke lever to project outward from the grip portion in the longitudinal direction of the yoke lever.

11. The wiper blade according to claim 10, wherein the movable cover member is pivotally coupled to an element of the lever member other than the main lever and the yoke lever.

12. The wiper blade according to claim 10, wherein the main lever or the intermediate lever includes an intermediate engaging portion having a bulging shape and extending along the longitudinal direction, and the intermediate engaging portion having a longitudinally middle part including a pivot shaft portion that pivotally supports the yoke lever and The yoke lever includes an intermediate engaged portion having a recessed shape, and the intermediate engaged portion does not engage the intermediate engaging portion when pivoted about the pivot shaft portion and engages the intermediate engaging portion in the wiping direction extending along the wiping surface.

13. The wiper blade according to claim 10, wherein the movable cover member includes two restriction portions sandwiching the following end to restrict movement of the following end in the wiping direction relative to the movable cover member between the holding portion and the grip portion.

14. The wiper blade according to claim 13, wherein the main lever or the intermediate lever includes an intermediate engaging portion having a bulging shape and extending along the longitudinal direction, and the intermediate engaging portion having a longitudinally middle part including a pivot shaft portion that pivotally supports the yoke lever; and the yoke lever includes an intermediate engaged portion having a recessed shape, and the intermediate engaged portion does not engage the intermediate engaging portion when pivoted about the pivot shaft portion and engages the intermediate engaging portion in the wiping direction extending along the wiping surface.

15. The wiper blade according to claim 8, wherein the movable cover member is pivotally coupled to an element of the lever member other than the main lever and the yoke lever.

16. The wiper blade according to claim 7, wherein the first engaged portion is arranged in the yoke lever to project outward from the grip portion in the longitudinal direction of the yoke lever.

17. The wiper blade according to claim 7, wherein the movable cover member is pivotally coupled to an element of the lever member other than the main lever and the yoke lever.

18. The wiper blade according to claim 7, wherein the yoke lever further includes a longitudinally intermediate portion pivotally coupled to the main lever or an intermediate lever coupled to the main lever;

the main lever or the intermediate lever includes an intermediate engaging portion having a bulging shape and extending along the longitudinal direction, and the intermediate engaging portion having a longitudinally middle part including a pivot shaft portion that pivotally supports the yoke lever; and the yoke lever includes an intermediate engaged portion having a recessed shape, and the intermediate engaged portion does not engage the intermediate engaging portion when pivoted about the pivot shaft portion and engages the intermediate engaging portion in the wiping direction extending along the wiping surface.

19. The wiper blade according to claim 7, wherein the movable cover member includes two restriction portions sandwiching the following end to restrict movement of the following end in the wiping direction relative to the movable cover member between the holding portion and the grip portion.

20. The wiper blade according to claim 7, wherein the main lever includes a first fin surface that generates a force for pushing the rubber blade against the wiping surface with wind received when a vehicle is traveling, the first fin surface extending in the longitudinal direction of the main lever; and the movable cover member includes a second fin surface that generates a force for pushing the following end of the rubber blade against the wiping surface with wind received when the vehicle is traveling, the second fin surface extending continuously with the first fin surface along a longitudinal direction of the movable cover member.

21. The wiper blade according to claim 7, wherein the movable cover member pivots about a pivot axis relative to the yoke lever, and the basal portion is extended from the pivot axis toward the main lever by a predetermined length.

* * * * *